United States Patent [19]

Gräff

[11] Patent Number: 4,870,760
[45] Date of Patent: Oct. 3, 1989

[54] METHOD AND AN APPARATUS FOR DRYING BULK MATERIAL, PREFERABLY OF PLASTIC GRANULES

[75] Inventors: Roderich W. Gräff, Egerländer Str. 2-4, 6108 Weiterstadt 2, Fed. Rep. of Germany

[21] Appl. No.: 191,894

[22] Filed: May 5, 1988

[30] Foreign Application Priority Data

Jul. 24, 1986 [DE] Fed. Rep. of Germany ....... 3625013
Jan. 23, 1988 [JP] Japan ................. 63-013474

[51] Int. Cl.⁴ ............................................. F26B 21/06
[52] U.S. Cl. ........................................... 34/32; 34/74; 34/80
[58] Field of Search .................. 34/26, 32, 17, 72, 73, 34/76, 77, 79, 80, 74; 55/387, 388, 389; 62/94

[56] References Cited

U.S. PATENT DOCUMENTS

| | | | |
|---|---|---|---|
| 3,766,660 | 10/1973 | Settlemyer | 34/80 X |
| 3,972,129 | 8/1976 | Gratt | 34/80 X |
| 4,337,584 | 7/1982 | Johnson | 34/77 X |
| 4,474,021 | 10/1984 | Harband | 62/94 |

Primary Examiner—Henry A. Bennet
Attorney, Agent, or Firm—Michael J. Striker

[57] ABSTRACT

A method and an apparatus for drying bulk material, preferably of plastic granules, in a drying hopper by means of dry air, whereby the exhaust air escaping from the drying hopper is dried in a drier containing a humidity adsorption means and fed to the bulk material as dry air. In order to utilize more efficiently the adsorption capacity of the adsorption means and to save thus thermal energy, the invention provides that the exhaust air is cooled by the heat-adsorbing portion of a heat pump before it is fed to the adsorption means. Preferably, a heat-conveying portion of said heat pump is used for preheating the dried air before being fed to the drying hopper for drying the bulk material.

12 Claims, 1 Drawing Sheet

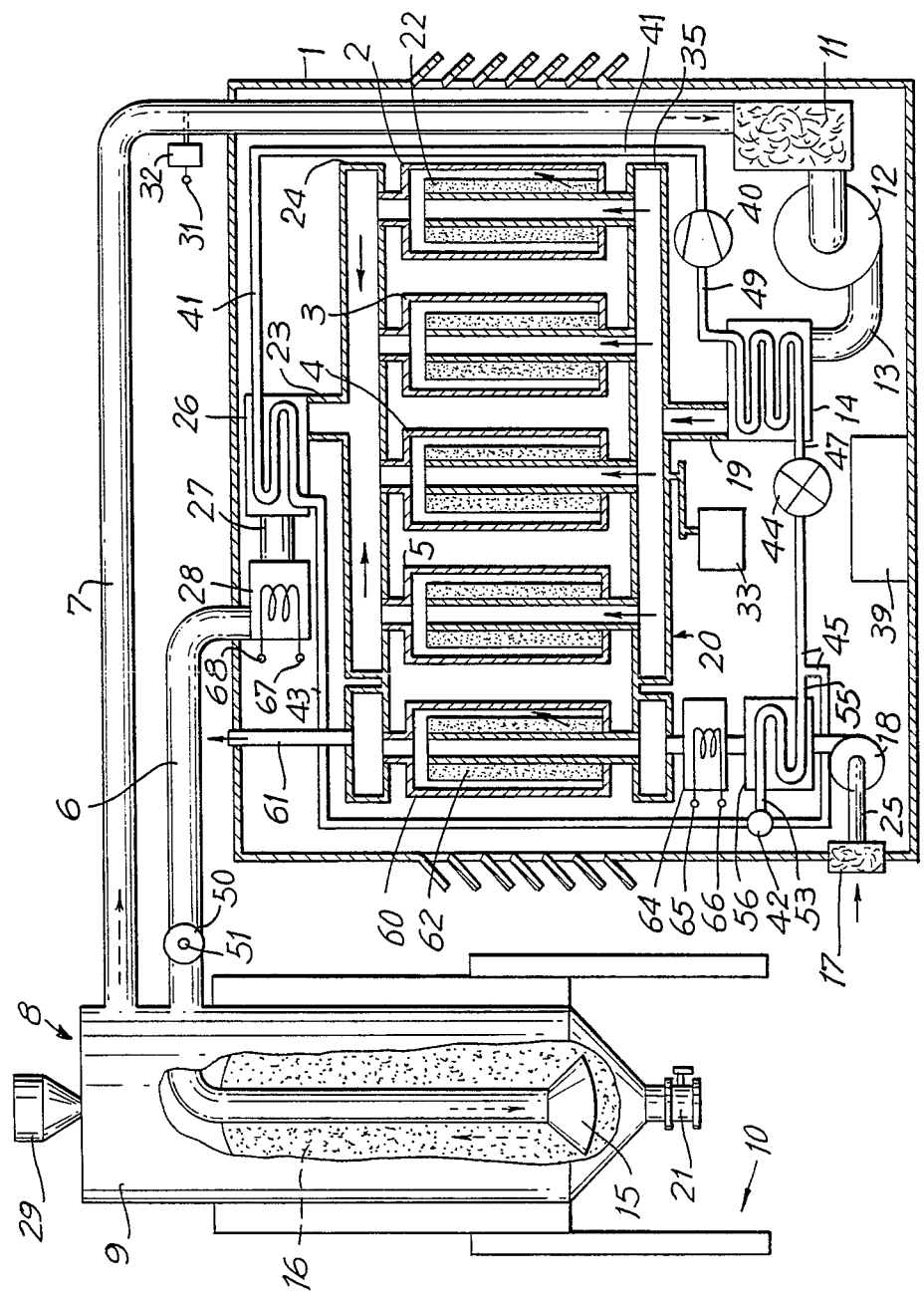

METHOD AND AN APPARATUS FOR DRYING BULK MATERIAL, PREFERABLY OF PLASTIC GRANULES

BACKGROUND OF THE INVENTION

The invention relates to a method for drying bulk material, preferably of plastic granules, in a drying hopper by means of dry air, wherein the exhaust air escaping from the drying hopper is dried in a drier containing a moisture ad-sorption means and is returned thereafter to the bulk material as dry air. The invention further relates to an apparatus for carrying out said method.

From German publication No. DE-OS 31 31 471 a method and an apparatus are known for drying exhaust air escaping from one or a plurality of drying hoppers each containing bulk material, and being fed to a drier containing a plurality of drying pots respectively filled with moisture adsorption means and for returning the effluent air from the drier as dry air through a conduit to the bulk material to be dried.

From German publication No. DE-AS 15 44 034 it is known to arrange a plurality of drying pots each containing a humidity adsorption means in such a way in an adsorption drier that their contents may be regenerated one after another at intervals by means of hot air. The regeneration cycles of the pots are offset in time in such a manner that always at least one pot having regenerated adsorption means is available for drying the exhaust air.

It is one of the characteristics of the adsorption means that the hotter it is the less it will adsorb moisture from the exhaust air. The capacity of the adsorption means to adsorb moisture is therefore only partly utilized when the drying process starts, as has been common, at a medium or high temperature. Moreover, the effluent air from the drier has a higher moisture content, i.e. it is not optimally dried.

For surmounting these drawbacks one may therefore conceive to cool the exhaust air by a water cooler before it is fed to the drier. Normally, however, cooling water is not available, i.e. tap-water has to be used causing great expenses. Furthermore, cooling is limited by the temperature of the cooling water which is frequently not colder than 25° C. to 30° C.

SUMMARY OF THE INVENTION

It is therefore an object of the invention to devise an improved method for drying bulk material, preferably plastic granules, which allows savings in thermal energy. According to a more specific object of the invention, the adsorption capacity of the adsorption means shall be utilized more efficiently in the method mentioned above for saving thermal energy and for reducing the residual moisture content of the dry air.

According to the invention the bulk material, preferably plastic granules, is dried in a drying hopper by means of dry air. The exhaust air escaping from the drying hopper is cooled in a heat-adsorbing portion of a heat pump before being fed to a drier containing a moisture adsorption means. The effluent air from the drier is returned to the bulk material as dry air. Thus, the temperatures of the exhaust air can be easily reduced down to 0° C. Due to these low temperatures the adsorption means can adsorb more moisture so that they need to be regenerated less frequently, which leads to a saving of energy. Moreover, the dry air escaping from the drier has a lower residual moisture content, i.e. a lower dew point, which accelerates the drying of the bulk material. Furthermore, no coolant is consumed. Finally, it is thus possible to use adsorption means which become effective only at low temperatures. The relatively expensive molecular sieve still effective at temperatures around 60° C. may, for instance, be replaced by the substantially cheaper silica gel, which requires temperatures of below 40° C. for effectively adsorbing moisture.

From German publication No. DE-OS 31 31 471 it is furthermore known that the dried air is heated before it is fed to the drying hopper in order to reduce the relative humidity of air and to provide the moist bulk material, preferably plastic granules, with the required vaporization heat and in order to raise the temperature of the bulk material to the desired processing temperature. In a further improvement of the invention energy used for heating-up the dry air may be saved when the dry air is heated by the heat-conveying portion of the heat pump. Thus, the heat extracted from the stream of exhaust air in the heat-adsorption of the heat pump may be ideally used for heating the dry air by the heat-conveying portion of said heat pump.

When the moisture adsorption means is regenerated by regeneration air, such regeneration air, according to a further improvement of the invention, is also pased through the heat-conveying portion of the heat pump before it is fed to a drying pot containing a moisture adsorption means to be regenerated. Thus, the heat-conveying portion of the heat pump is additionally cooled and energy is saved by pre-heating the regeneration air.

The use of a heat pump is recommended as a coolant recirculation loop.

For carrying out the above explained method, the invention provides an apparatus comprising a drying hopper for the bulk material. An exhaust air outlet of the drying hopper is coupled via an exhaust air conduit to a direr including at least one drying pot containing a moisture adsorption means. A dry air outlet conduit of the drier is coupled to the drying hopper and extends into the bulk material within the drying hopper. A heat pump recirculation loop is provided, the heat-adsorbing portion of which is passed through by the exhaust air. Said heat-adsorbing portion is preferably arranged in the exhaust air conduit after the blower of the dryer and advantageously directly before the inlet of the drying pot.

In a further improvement of the invention the heat-conveying portion of the heat pump is connected to the dry air outlet conduit, conveniently up-stream of a heater for the dry air.

The apparatus is preferably provided with a regeneration air conduit which includes a separate blower and is coupled to a drying pot with humidity adsorption material to be regenerated. In a preferred further improvement of the invention a section of the heat-adsorbing portion of the heat pump is arranged in the regeneration air conduit.

DETAILED DESCRIPTION OF THE PREFERRED EMBODIMENT

The invention is explained in detail below with reference to the embodiment illustrated in the accompanying drawing.

A drying hopper 8 mounted on a frame 10 comprises a cylindrical container 9, which has a funnel 29 on its upper end and a conical form on its lower end terminating in an outlet port 21. Near the upper end of container 9 an exhaust air conduit 7 is mounted to the hopper and communicates with the the interior of container 9 and extends in a drier 1. A dry air conduit 6 is mounted to drier 1 and extends into the interior of container 9 and ends in a distributor nozzle 15 arranged within the container 9 and opening into the conical section thereof. During operation container 9 is filled with moist plastic granules 16, through which warm air emanating from distributor nozzle 15 is passed from below in upward direction. When passing the granules, the air adsorbs the moisture contained in or on the granules and escapes from container 9 into the exhaust air conduit 7 as relatively humid exhaust air.

In drier 1 the exhaust air conduit 7 is mounted to a filter box 11 for removing possibly entrained particles from the exhaust air passing through the filter box 11. The output pipe of the filter box is coupled to the suction port of a blower 12, which sucks off exhaust air from container 9 through the exhaust air conduit 7 and filter box 11 and presses the humid exhaust air through a pipe bend 13 into an evaporator 14 acting as heat-absorbing portion of a heat pump. On the down-stream side the evaporator 14 is connected via a pipe piece 19 with a distributor manifold 35 of a carrousel 20 including, in the illustrated example, four drying pots, 2, 3, 4, 5 which are connected in parallel to the distributor manifold 35.

All drying pots 2, 3, 4, 5 are of same construction. So drying pot 2 includes an annular chamber 22 surrounding a perforated axial inlet duct along the length of the cylindrical pot 2. The annular chamber contains a package of silica gel as humidity adsorption means for the humidity carried along in the exhaust air. As the axial inlet duct has a closed end the exhaust air is pressed radially through chamber 22 by the blower 12 into a circumferential outlet duct which, on the up-stream side, is connected with an air collecting manifold 24. The dry air streams emanating from each outlet duct of the drying pots 2 through 5 are brought together and are fed through a pipe 23 to a condenser 26 acting as a heat-conveying portion of the heat pump. Condenser 26 is connected via a pipe piece 27 with a heater 28 heating up the dry air pre-heated in the condenser 26 to the temperature required for the drying process in the drying hopper 8. The outlet of heater 28 is connected with the dry air conduit 6.

The heat pump comprises a compressor 40, the output pipe 41 of which contains pressurized coolant and is connected with the input port of condenser 26. The output port of condenser 26 is connected to an input of a first valve 42 through a further pipe 43. A first output of valve 42 is connected with an high-pressure input of an expansion valve 44 by means of a pipe 45. Via a pipe 47 the low-pressure output of the expansion valve 44 is connected with evaporator 14, which is connected with the entry of compressor 40 via pipe 49 for completing the coolant recirculation loop. From a second output of valve 42 a pipe 53 is connected to a further condenser 56, the coolant down-stream output of which is coupled through a pipe 55 to pipe 45 and includes, if required, a nonreturn valve not illustrated.

Carrousel 20 includes at least one additional drying pot 60, which is identical to everyone of pots 2, 3, 4, 5. The annular chamber 62 of pot 60 contains humid silica gel to be regenerated and is passed through by regeneration air for regeneration. This air is sucked in by an additional blower 18 from the outside of drier 1 via an air pipe 25 through filter 17 and is pressed through the condenser 56 for being pre-heated and subsequently through a further heater 64. The warm regeneration air emanating from heater 64 passes through annular chamber 62 of drying pot 60 and extracts the moisture left in the silica gel. Through a funnel 61 the consumed regneration air is released to the outside of drier 1. It is to be noted that at intervals in time carrousel 20 turns such that one of the drying pots 2, 3, 4, 5 is switched into the regeneration cycle and simultaneously the regenerated pot 60 is switched into the air drying cycle as described herein. Thus, four of the five shown drying pots are always drying air and one drying pot is being regenerated.

Drier 1 comprises an electrical control device 39, which controls proper operation of the drier. The inputs of control device 39 are connected in non-illustrated manner with the signal output 51 of a temperature sensor 50 arranged in the dry air conduit 6 for recording the temperature of the dry air fed to drying hopper 8, with the signal output 31 of a temperature sensor 32 arranged in the exhaust air pipe 7 for recording the exhaust air escaping drying hopper 8, and with non-illustrated pressure control devices arranged in the coolant recirculation loop. The control device 39 switches a motor 33 for driving the carrousel 20, by which a drying pot to be regenerated is turned into the regeneration cycle, as has been described for drying pot 60, and a pot already regenerated is connected to distributor manifold 35 and the collecting manifold 24.

The non-illustrated outputs of control device 39 are connected in non-illustrated manner with the electric terminals 65, 66 of the further heater 64 and with the electric terminals 67, 68 of heater 28.

Depending on the type and properties of the material to be dried the drying temperature of the bulk material in drying hopper 8 varies between approx. 80° C. and approx. 180° C. The exhaust air escapes from the drying hopper through exhaust air conduit 7 with a temperature between 50° C. and 100° C. In the evaporator 14 this warm exhaust air is cooled down to a temperature of approx. 0° C. to approx. 30° C. and enters with this temperature one of drying pots 2 to 5. In this range of temperature the silica gel develops its full humidity adsorption capacity in the annular chambers 22. The dried air emanating from one of the annular chambers 22 is too cold for the drying process in drying hopper 8 and is therefore heated to a temperature of approx. 50° C. to approx. 80° C. in condenser 26, so that it has then to be heated in the heater 28 only by a temperature difference from approx. 50° C. to approx. 80° C. to the drying temperature of 80° C. to 180° C. If the coolant recirculation loop has, for instance, a power consumption of 2 kW and the dry air throughput through the drying hopper amounts to e.g. 400 m$^3$/h, evaporator 14 and condenser 28 save a considerable amount of energy due to the the extraction of humidity from the exhaust air at the low temperatures mentioned.

In a first operation mode of the apparatus described the energy balance and the required temperatures may allow that the further condenser 56 is inactive in the coolant recirculation loop. For this purpose, valve 42 is switched in such a way that it blocks pipe 53 from the stream of coolant and couples pipe 43 to pipe 45 so that the stream of coolant bypasses condenser 56. Condenser 56 will then have no effect of the regeneration air passing through it. In an alternative operating mode, valve 42 is switched in such a manner that its output connected to pipe 45 is blocked from the stream of coolant and pipe 43 is coupled to pipe 53 thereby activating the further condenser 56. Condenser 56 then preheats the regeneration air delivered by blower 18 from approx. 20° C. to approx. 30° C. to a temperature of approx. 40° C. up to approx. 70° C., while the temperatures of air before and after the drying pots 2 to 5 remain substantially the same as described for the first operating mode. Thus, for a regeneration air throughput of approx. 200 m$^3$/h through a pot 60 to be regenerated, the temperature of the regeneration air entering pot 60 is raised to appropriate values in an energy-saving manner.

It is within the scope of the invention to extract the heat carried along by the consumed regeneration air leaving the drying pot and to employ this heat in the regeneration process, with the water separated from the then cooled regeneration air being discarded.

What is claimed is:

1. A method for drying bulk material of plastic granules, in a drying hopper by means of dry air, comprising the steps of: cooling exhaust air escaping from the drying hopper in a heat-adboring portion of a heat pump; drying the cooled air from the drying hopper by humidity adsorbing means contained in a drier; and feeding the dried exhaust air emanating from the drier into the drying hopper as dry air for drying the bulk material.

2. Method according to claim 1, wherein the drying includes drying the exhaust air in a drying pot in the drier, the cooling including cooling the exhaust air directly before the exhaust air enters the drying pot within the drier.

3. Method according to claim 1, and further comprising heating the dried exhaust air in a heat-conveying portion of the heat pump.

4. Method according to claim 1, further comprising regenerating the humidity adsorbing means by regeneration air; and preheating the regeneration air in a separate heat-conveying portion of the heat pump.

5. Method according to claim 3, further comprising regenerating the humidity-adsorbing means by regeneration air; and preheating the regeneration air in a separate heat-conveying portion of the heat pump.

6. An apparatus for drying bulk material of plastic granules, comprising a drying hopper formed to be loaded with said bulk material and having an exhaust air outlet and an internal dry air conduit which is extendable into said bulk material and which terminates in an air outlet nozzle, a drier connected to said exhaust air outlet via an exhaust air conduit and connected to said internal dry air conduit via a dry air conduit, said drier including a blower for sucking in exhaust air escaping from the drying hopper through said exhaust air conduit and for pressing the exhaust air through at least one drying pot mounted within the drier to said dry air conduit, the drying pot containing humidity adsorbing material; and a heat pump with a heat-adsorbing portion mounted within the drier upstream of said drying pot for being passed through by and for cooling the exhaust air escaping from the drying hopper and supplying the cooled exhaust air to said drying pot with said humidity adsorbing material of said drier.

7. Apparatus according to claim 6, wherein the heat-adsorbing portion is directly mounted within the drier for being passed through by the exhaust air delivered by the blower and for feeding the cooled exhaust air to the drying pot.

8. Apparatus according to claim 6, wherein a heat-conveying portion of the heat pump is mounted in the drier downstream of the drying pot for preheating the dried air emanating from the drying pot.

9. Apparatus according to claim 8, wherein the heat-conveying portion is mounted in the drier for being passed through by the dried air emanating from the drying pot and for feeding the pre-heated dried air to a heater mounted in the drier for heating the pre-heated dried air.

10. Apparatus according to claim 6, wherein the drier includes at least two drying pots coupled parallel into the steam of exhaust air and each including humidity adsorbing material, the drier having regeneration means for passing regeneration air through one of said drying pots, a heat-conveying section of the heat pump being coupled upstream of said one drying pot for pre-heating the regeneration air passing through said one drying pot.

11. Apparatus according to claim 10, wherein the coolant recirculation loop includes bypass means for selectively rendering said heat-conveying section inactive.

12. Apparatus according to claim 8, wherein the drier includes at least two drying pots coupled parallel into the steam of exhaust air and each including humidity adsorbing material, the drier having regeneration means for passing regeneration air through one of said drying pots, a heat-conveying section of the heat pump being coupled upsteam of said one drying pot for pre-heating the regeneration air passing through said one drying pot.

* * * * *